United States Patent [19]
Toyohara et al.

[11] Patent Number: 6,104,848
[45] Date of Patent: Aug. 15, 2000

[54] WDM OPTICAL TRANSMITTER

[75] Inventors: Atsushi Toyohara; Katsushi Akahori, both of Tokyo, Japan

[73] Assignee: NEC Corporation, Tokyo, Japan

[21] Appl. No.: 09/033,668

[22] Filed: Mar. 3, 1998

[30] Foreign Application Priority Data

Mar. 4, 1997 [JP] Japan .................................. 9-063970

[51] Int. Cl.$^7$ .................................................. G02B 6/00
[52] U.S. Cl. .............................. 385/24; 385/15; 359/154; 359/341
[58] Field of Search .................................. 359/341–344, 359/176, 179; 385/24.15; 372/6

[56] References Cited

U.S. PATENT DOCUMENTS

| | | | |
|---|---|---|---|
| 5,524,144 | 6/1996 | Suzuki | 359/176 |
| 5,530,585 | 6/1996 | Reid et al. | 359/344 |
| 5,703,711 | 12/1997 | Hamada | 359/341 |
| 5,838,488 | 11/1998 | Kobayashi | 359/341 |

FOREIGN PATENT DOCUMENTS

| | | |
|---|---|---|
| 64-7727 | 1/1989 | Japan . |
| 2-282229 | 11/1990 | Japan . |
| 3-269522 | 12/1991 | Japan . |
| 4-43991 | 2/1992 | Japan . |
| 8-288930 | 11/1996 | Japan . |
| 8-321824 | 12/1996 | Japan . |
| 9-45977 | 2/1997 | Japan . |
| 09-205403 | 8/1997 | Japan . |
| 9-205403 | 8/1997 | Japan . |

*Primary Examiner*—Rodney Bovernick
*Assistant Examiner*—Ellen Kim
*Attorney, Agent, or Firm*—Whitham, Curtis & Whitham

[57] ABSTRACT

It is the object of the invention to provide a WDM optical transmitter, in which levels of optical signals transmitted therefrom is increased and equalized. Optical amplifiers, which are provided with rare metal doped optical fibers and laser diodes for pumping them, are respectively connected with the output ports of light sources. The gains of the optical fiber amplifiers are so controlled that levels of the optical signals at the output port of a coupler, which multiplexes the output powers of the optical fiber amplifiers, are equalized.

7 Claims, 4 Drawing Sheets

WDM OPTICAL TRANSMITTER

FIELD OF THE INVENTION

The invention relates to wavelength division multiplexed (WDM, hereinafter) optical communication, and especially to a WDM optical transmitter which equalizes levels of respective optical signals transmitted therefrom.

BACKGROUND OF THE INVENTION

As means for realizing an optical communication system with high capacity, a WDM optical communication system, in which plural optical signals with different wavelengths are multiplexed and propagated through a single optical fiber, is being actively investigated, and information transmitted therethrough is epochally increased.

In such a WDM optical communication system, it. is very important that a transmission distance is extended as long as possible and transmission levels of the respective optical signals are kept high and equalized.

The conventional WDM optical transmitter is composed of plural light sources for respectively generating optical signals with different wavelengths and a coupler for multiplexing them. The levels of the optical signals are respectively adjusted by controlling driving currents supplied to the laser diodes (LDs, hereinafter) in the light sources. Each of the optical signal levels is monitored at the output port of the coupler, and so adjusted that it becomes equal to the minimum value therein.

Another method for equalizing the output levels of the optical signals at the output port of the coupler is as follows. Variable optical attenuators are respectively connected with the output ports of the light sources, and the outputs of the variable optical attenuators are multiplexed by the coupler. First, each of the light sources is so adjusted that its output power becomes the maximum. Next, the variable optical attenuators are so adjusted that each of the optical signals at the output port of the coupler becomes equal to the minimum value therein.

Common disadvantage of both the aforementioned output control circuits in the conventional WDK optical transmitters is that the optical signal levels at the output port of the coupler are adjusted by attenuating the output powers of the light sources based on the minimum value therein, hence high transmitting optical signal levels cannot be obtained.

SUMMARY OF THE INVENTION

Accordingly, it is an object of the invention to provide a WDM optical transmitter which generates optical signals with high transmitting powers and equalizes their levels.

According to a feature of the invention, a WDM optical transmitter comprises:

a wavelength division multiplexed (WDM, hereinafter) optical transmitter comprising:

plural light sources for generating plural optical signals having wavelengths different from each other, plural optical amplifiers respectively connected with output ports of the plural light sources, a coupler for multiplexing plural output optical signals of the plural optical amplifiers, and means for controlling gains of the plural optical amplifiers so that levels of the plural optical signals at an output port of the coupler are equalized.

In the WDM optical transmitter according to the invention, the variable optical attenuators are respectively connected with the output ports of the light source, and the outputs of the variable optical attenuators are multiplexed by the coupler and propagated through a single optical transmission line. The output powers of the light sources are respectively kept to be constant by controlling driving currents supplied to LDs in the light sources, and supplied to the optical amplifiers. The optical amplifiers respectively amplify the outputs of the light sources, and the outputs of the optical amplifiers are multiplexed by the coupler and supplied to the optical transmission line, where each of the levels of the optical signals supplied thereto are kept to be the same predetermined value by controlling the gains of the optical amplifiers.

BRIEF DESCRIPTION OF THE DRAWINGS

The invention will be explained in more detail in conjunction with appended drawings, wherein.

DESCRIPTION OF THE PREFERRED EMBODIMENTS

Before explaining a WDM optical transmitter in the preferred embodiment according to the invention, the aforementioned conventional WDM optical transmitter will be explained referring to FIGS. 1A and 1B.

Figure 1A:
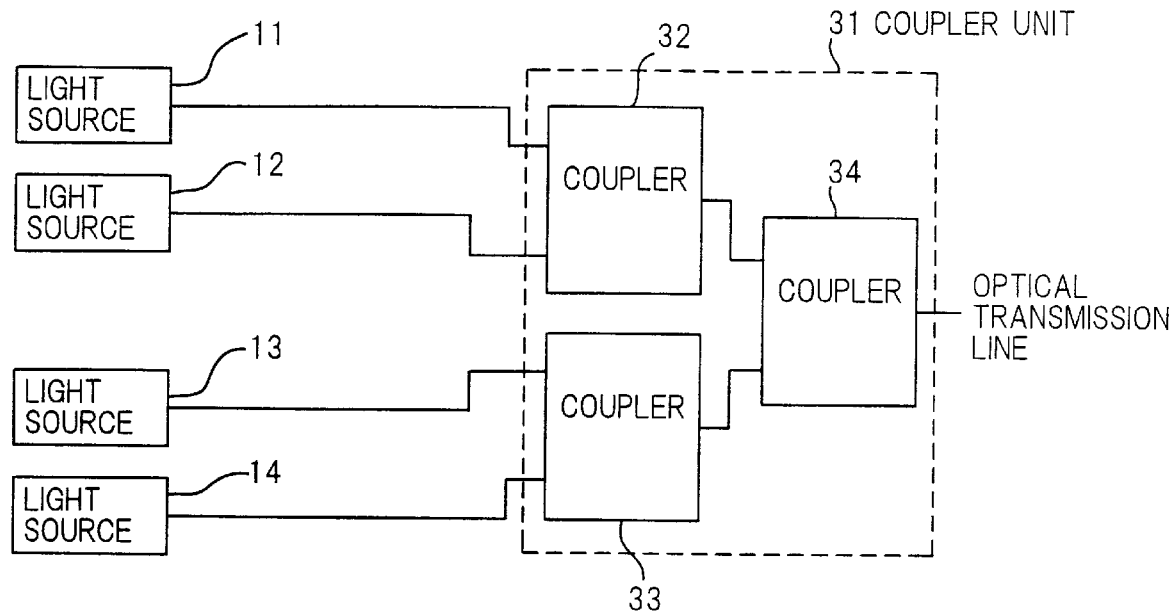
FIGS. 1A and 1B are block diagrams for showing examples of conventional WDM optical transmitters.
Figure 1B:
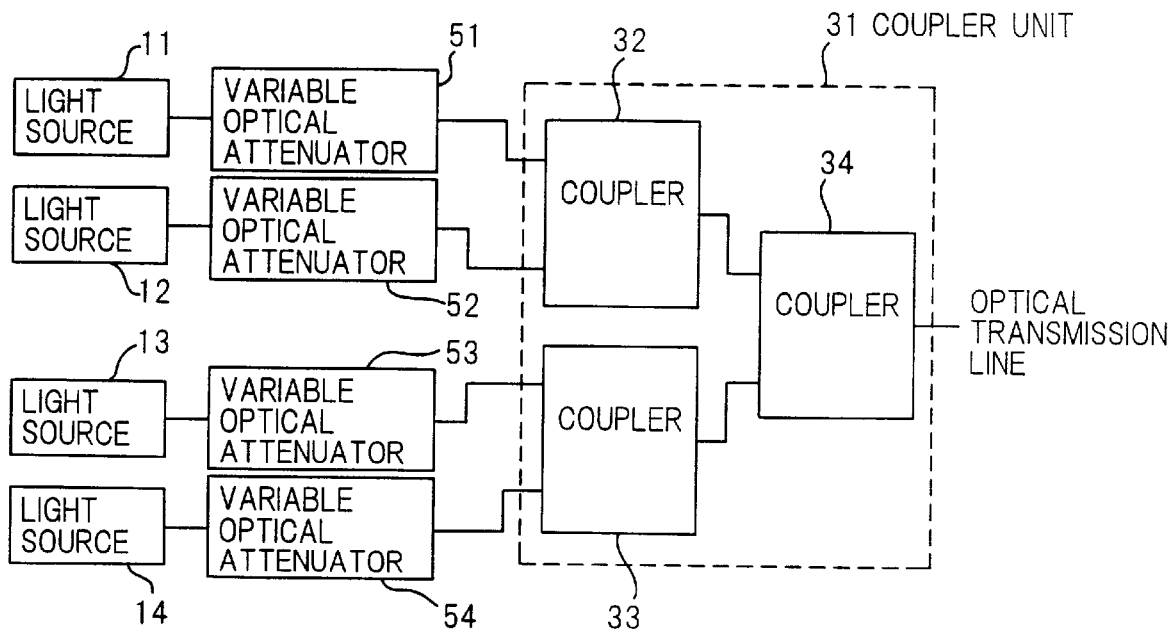

FIGS. 1A and 1B show conventional WDM optical transmitters, in which optical signals are multiplexed and their transmission levels are equalized.

In ordinary cases, a coupler unit 31 comprising couplers 32 to 34 is used in order to multiplex plural optical signals generated by light sources 11 to 14, but attenuation coefficients of the couplers 32 to 34 change dependently on a signal wavelength, and levels of the optical signals multiplexed by the coupler unit 31 become unequal to each other.

In the conventional WDM optical transmitter shown in FIG. 1A, the light sources 11 to 14 are so adjusted that the levels of the optical signals supplied from the output port of the coupler unit 31 are equalized. In the conventional WDM transmitter shown in FIG. 1B, variable optical attenuators 51 to 54 are respectively connected with the output ports of the light sources 11 to 14, and they are so adjusted that each of the optical signal levels at the output port of the coupler 31 becomes equal to the minimum value therein.

Disadvantages of the aforementioned WDM optical transmitter have been described in the background of the invention.

Next, a WDM optical transmitter according to the invention will be explained in a preferred embodiment referring to the appended drawings.

Figure 2A:
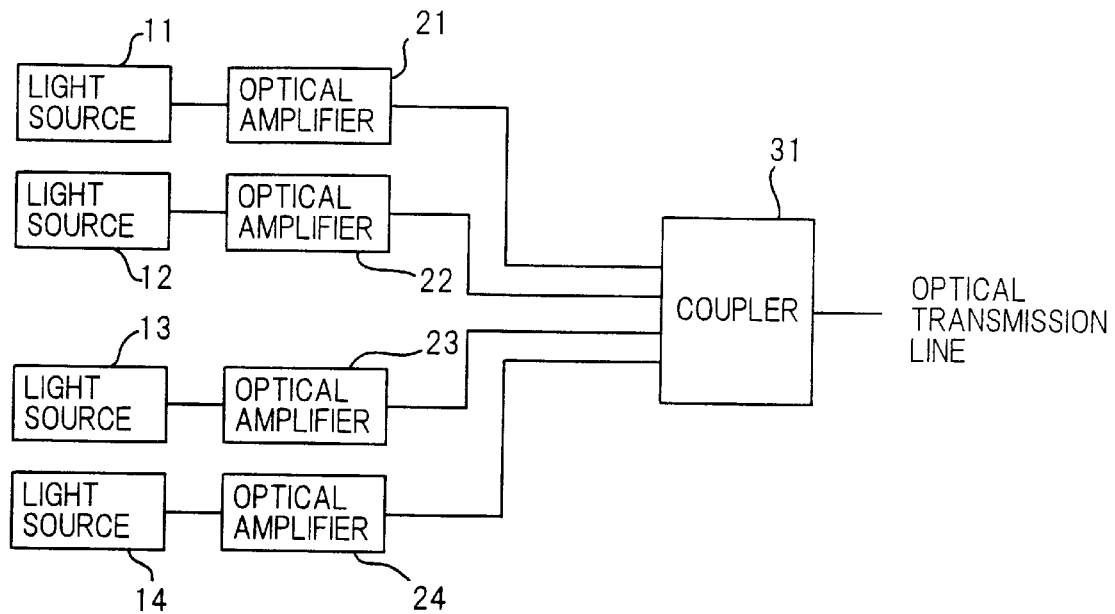
FIGS. 2A and 2B are block diagrams for showing a preferred embodiment of the WDM optical transmitter according to the invention.
Figure 2B:
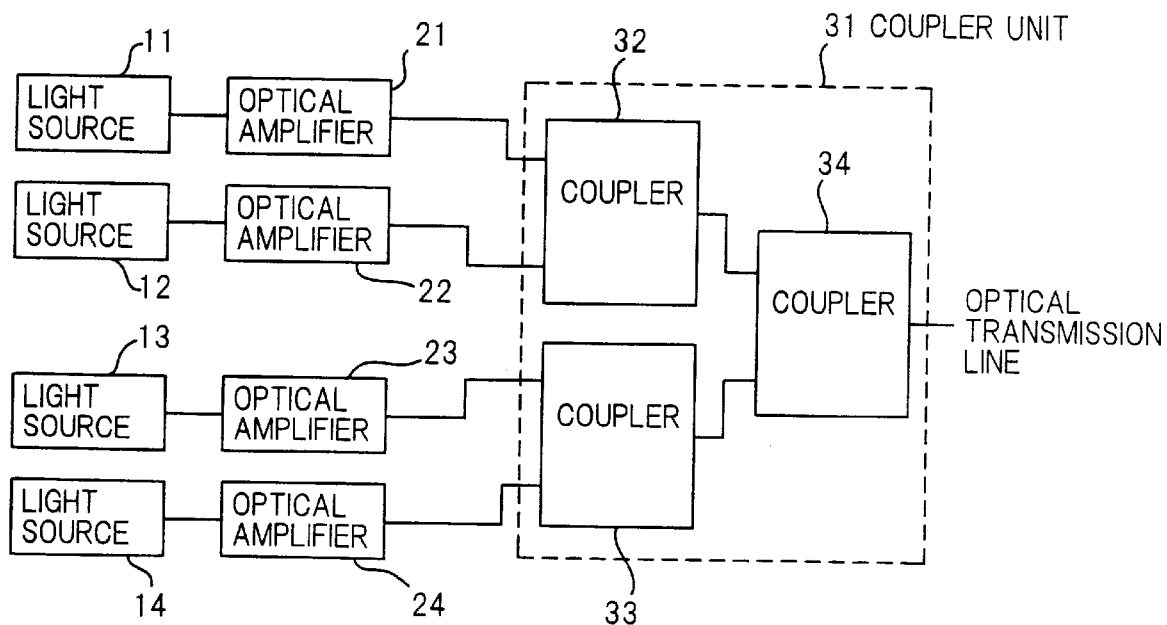

FIG. 2A and 2B are block diagrams of WDM optical transmitters shown as preferred embodiments of the invention. The WDM optical transmitter shown in FIG. 2A is composed of light sources 11 to 14, optical amplifiers 21 to 24 for respectively amplifying the outputs of the light sources 11 to 14, and a coupler 31 for multiplexing the outputs of the optical amplifiers 21 to 24.

The light sources 11 to 14 respectively comprise LDs with different laising wavelengths, and their output optical powers are respectively controlled by the level control of driving currents supplied from the outside.

The optical amplifiers 21 to 24 are composed of rare earth metal doped optical fibbers and LDs for pumping them. The rare earth metal doped optical fiber is an erbium (Er) -doped optical fiber (EDF, hereinafter), to a core of which is a small amount of Er is added, in most cases. The pumping LD generates a light power in the 1.48 µm or 0.98 µm wavelength band.

The output power level of the optical fiber amplifier is controlled by adjusting the output power of the pumping LD for the EDF.

The output powers of the optical amplifiers 21 to 24 are multiplexed by a coupler 31 and propagated through a signal optical transmission line.

Although the driving currents supplied to the respective light sources have the same magnitude, the output powers of the light sources are different from each other. However, the gains of the optical amplifiers are so controlled that the levels of the optical signals at the output port of the coupler 31 are equalized independently of the wavelength dependent attenuation coefficient of the coupler 31 by controlling the gains of the optical amplifiers. The coupler 31 may replaced by the coupler unit 31 comprising the couplers 32 to 34.

As another way for controlling the levels of the optical signals at the output port of the coupler, the following steps may be adopted. The driving currents supplied to the light sources are so controlled that each of the output powers of the light sources becomes the maximum in consideration of the relation between the output power and the driving current. Next, the gains of the optical amplifiers are so controlled that the levels of the optical signals at the output port of the coupler can be equalized.

The structure of the WDM optical transmitters shown in FIGS. 2A and 2B are the same except the connection of the coupler modules. In the WDM optical transmitter shown in FIG. 2B, dependency of the attenuation coefficient of the coupler on the wavelength of the optical signal becomes noticeable, because the coupler is constructed by cascade connection of plural coupler modules, each having two input ports. However, the levels of the optical signals at the output port of the coupler can be satisfactorily increased and equalized by adjusting gains of the optical amplifiers.

Figure 3:
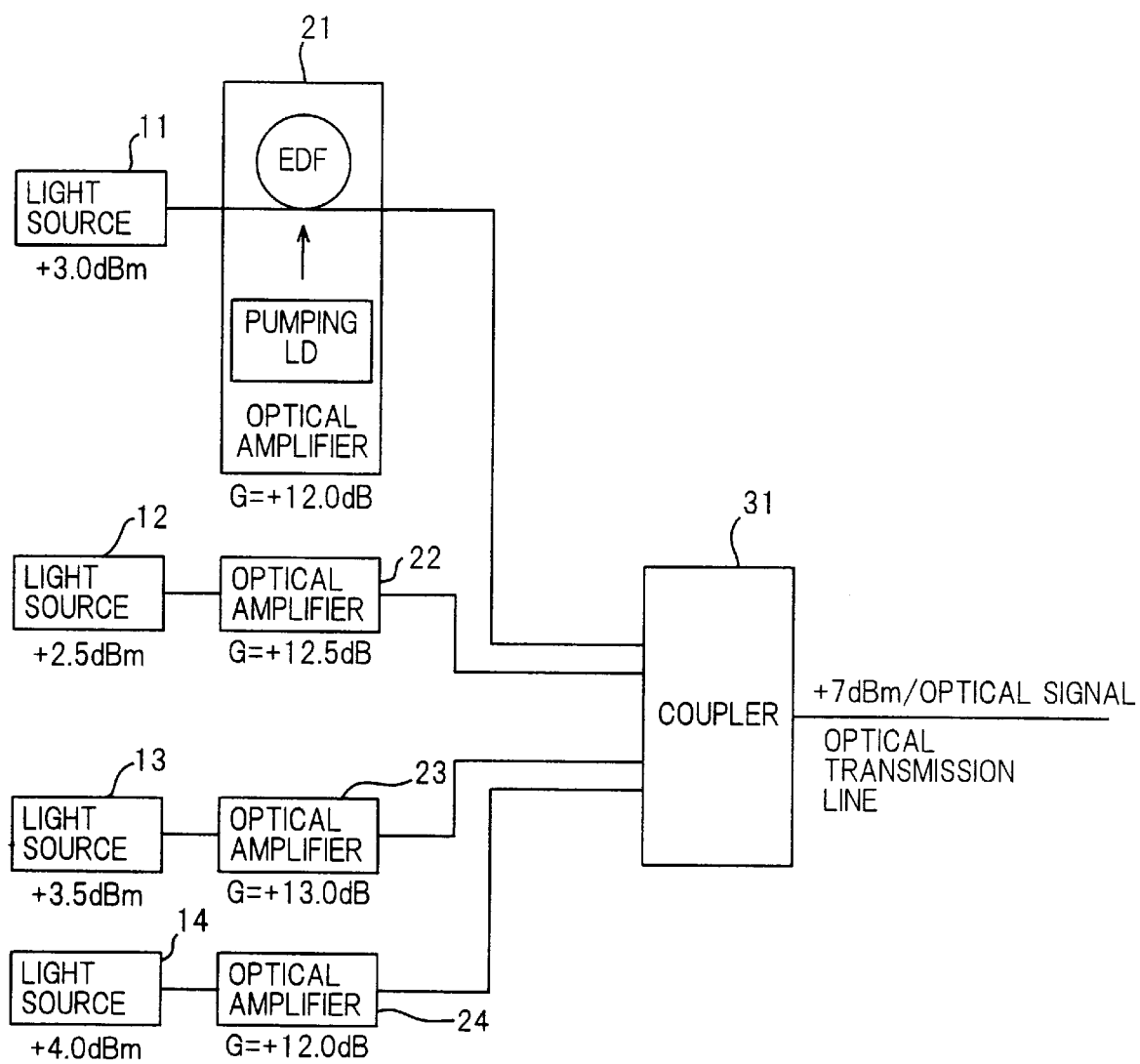
FIG. 3 shows numerical values of optical signal levels and gains of optical amplifiers in a WDM optical transmitter shown in FIG. 2A.

In the WDM optical transmitter shown in FIG. 3 an arrayed waveguide grating is used as the coupler 31, and an optical fiber amplifier, which comprises an EDF and a LD for pumping the EDF, is used as each of the optical amplifiers 21 to 24.

In the WDM optical transmitter, the power level of each of the optical signals at the output port of the coupler 31 is set up to be +7 dBm, and the wavelengths and the output powers of the respective optical signals are shown as follows.

| 1547 nm | +3.0 dBm |
| 1549 nm | +2.5 dBm |
| 1552 nm | +3.5 dBm |
| 1554 nm | +4.0 dBm |

The attention coefficients of the coupler 31 are shown au follows.

| 1547 nm | 8.0 dB |
| 1549 nm | 8.0 dB |
| 1552 nm | 9.5 dB |
| 1554 nm | 9.0 dB |

Accordingly, the gains required for the respective optical amplifiers are shown as follows.

| 1547 nm | +12.0 dB |
| 1549 nm | +12.5 dB |
| 1552 nm | +13.0 dB |
| 1554 nm | +12.0 dB |

According to data shown in the above, the differences among the power levels of the optical signals at the output port of the coupler 31 can be canceled.

Moreover, in the WDM optical transmitter shown in FIG. 3, an optical fiber amplifier for the 1.55 µm band is used as each of the optical amplifiers 21 to 24, and the WDM coupler is used as the coupler 31. Accordingly, amplified spontaneous emission (ASE, hereinafter) noise in the 1.53 µm band can be suppressed by the wavelength dependent attenuation coefficient of the coupler, hence degradation of signal to noise (S/N, hereinafter) ratio of the transmitted optical signal can be prevented.

Figure 4:
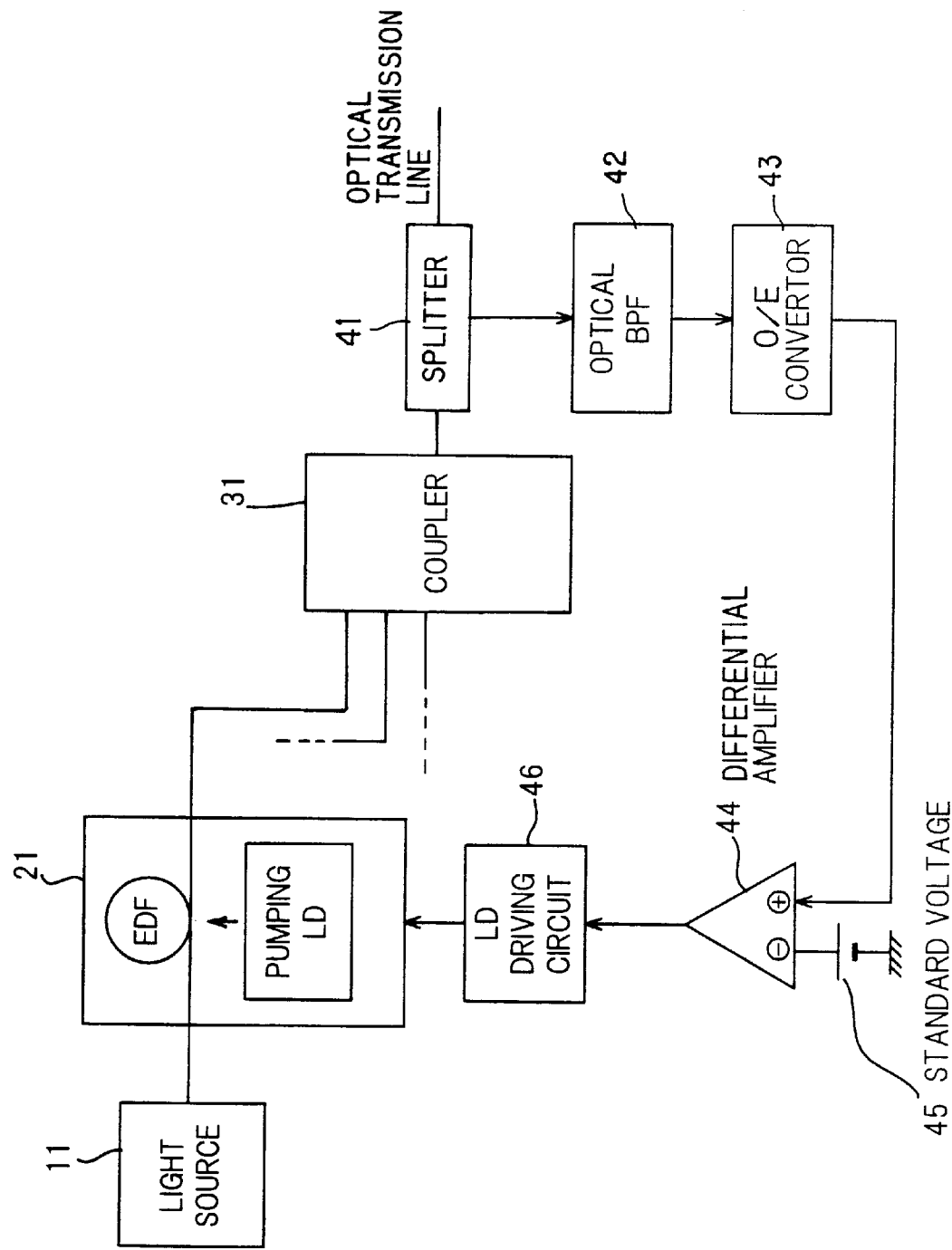
FIG. 4 shows an example of a gain control circuit for adjusting a gain of an optical fiber amplifier used in the WDM optical transmitter shown in FIG. 3.

Next, means for controlling the gains of the optical amplifiers 21 to 24 will be explained referring to FIGS. 3 to 4. Means for controlling the gains of the optical fiber amplifiers is composed of plural gain control circuits, which respectively correspond to the output powers generated by the light sources 11 to 14. A gain control circuit shown in FIG. 4 corresponds to the output power generated by the light sources 11. A part of the optical power generated by the light source 11 is branched by a splitter 41 and transmitted through an optical band pass filter (BPF, hereinafter) 42. The output of the optical BPF 42 is supplied to an optical to electrical (O/E, hereinafter) converter 43 and converted into an electrical signal, which is supplied to one of input terminals of a differential amplifier 44. Another input terminal of the differential amplifier 44 is connected with a standard (reference) voltage 45. The output of the differential amplifier 44 is supplied to a LD driving circuit 46 for driving the pumping LD in the optical fiber amplifier 21. Accordingly, the gain of the optical fiber amplifier 21 is controlled based on comparison between the level of the optical power and the standard voltage, hence the level of the optical signal generated by the light source 11 is kept to be equal to a predetermined level at the output port of the coupler 31. The levels of the other optical signals at the output port of the coupler are respectively controlled by the same control circuits as that shown in FIG. 4.

In the aforementioned embodiment according to the invention, the WDM coupler is used as the coupler, but the coupler of other type, such as an n to 1 branch coupler, can be adopted. Moreover, in the above description, explanation is given in a case where the optical signal in the 1.55 µm band is amplified by the optical fiber amplifier comprising an EDF, but an optical fiber amplifier comprising a praseodymium doped optical fiber (PDF) amplifier can be adopted in a case where the wavelength of the optical signal is in the 1.3 µm band. Still more, an optical amplifier of semiconductor type can be adopted in stead of the optical fiber amplifier in order to equalize the levels of the output optical signals.

As mentioned in the above, according to the WDM optical transmitter according to the invention, since the levels of the output optical signal levels at the output port of the WDM optical transmitter can be adjusted in consideration of the wavelength dependent attenuation coefficient of the optical coupler. the levels of the output optical signals can be increased and easily equalized.

Moreover, in the WDM optical transmitter according to the invention, the optical fiber amplifier is used as the optical amplifier and the WDM coupler is used as the coupler. Accordingly, ASE noise generated in the optical fiber amplifier can be suppressed by the wavelength dependent attenuation coefficient of the WDM coupler, and degrade of S/N ratio of the transmitted optical signal can be prevented.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A wavelength division multiplexed (WDM, hereinafter) optical transmitter comprising:

plural light sources for generating plural optical signals having wavelengths different from each other, plural optical amplifiers respectively connected with output ports of said plural light sources, a coupler for multiplexing plural output optical signals of said plural optical amplifiers, and means for controlling gains of said plural optical amplifiers by plural feedback loops from said plural output optical signals respectively so that levels of said plural optical signals at an output port of said coupler are equalized.

2. A WDM optical coupler according to claim 1, wherein: each of said plural optical amplifiers is an optical fiber amplifier comprising a rare earth metal doped optical fiber and a laser diode (LD, hereinafter) for pumping it.

3. A WDM optical transmitter according to claim 2, wherein: said rare earth metal doped optical fiber is an erbium or a praseodymium doped optical fiber.

4. A WDM optical transimitter according to claim 2, wherein: said means for controlling gains of said plural optical amplifiers is composed of plural gain control circuits for said respective optical amplifiers, each of which comprising: means for extracting an optical signal to be inspected, means for controlling a driving current of said pumping LD for said rare earth metal doped optical fiber based on comparison between a level of said extracted optical signal and a predetermined standard voltage.

5. The WDW optical transmitter according to claim 2, wherein said means for controlling gains of said plural optical amplifiers comprises plural gain control circuits, said gain control circuit including:

a splitter for extracting a split optical signal from said output optical signals;

an optical band pass filter for receiving and filtering said split optical signal;

an optical to electrical convertor for converting the output of said optical band pass filter into an electrical signal;

a differential amplifier connecting to said optical to electrical convertor for outputting a control signal; and a laser diode driving circuit, receiving said control signal for driving a pumping laser diode in order to equalize said optical signal.

6. A WDM optical transmitter according to claim 1, wherein: each of said plural optical amplifiers is an optical amplifier of semiconductor type.

7. A WDM optical transmitter according to claim 1, wherein: said coupler is a WDM coupler or a n to 1 branch coupler, where n means multiplexed density.

* * * * *